US011216214B2

(12) United States Patent
Oh

(10) Patent No.: US 11,216,214 B2
(45) Date of Patent: Jan. 4, 2022

(54) MEMORY SYSTEM AND OPERATION METHOD THEREOF

(71) Applicant: SK hynix Inc., Icheon-si (KR)

(72) Inventor: Yong-Seok Oh, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 49 days.

(21) Appl. No.: 16/711,076

(22) Filed: Dec. 11, 2019

(65) Prior Publication Data

US 2020/0225875 A1 Jul. 16, 2020

(30) Foreign Application Priority Data

Jan. 15, 2019 (KR) .......................... 10-2019-0005162

(51) Int. Cl.
 *G06F 3/06* (2006.01)
 *G06F 12/02* (2006.01)
 *G06F 9/54* (2006.01)

(52) U.S. Cl.
CPC .......... *G06F 3/0659* (2013.01); *G06F 3/0614* (2013.01); *G06F 3/0622* (2013.01); *G06F 3/0679* (2013.01); *G06F 9/546* (2013.01); *G06F 12/0246* (2013.01); *G06F 2212/7207* (2013.01)

(58) Field of Classification Search
CPC .... G06F 3/0659; G06F 3/0614; G06F 3/0679; G06F 3/0622; G06F 12/0246; G06F 9/546; G06F 2212/7207
See application file for complete search history.

(56) References Cited

U.S. PATENT DOCUMENTS

2009/0240664 A1* 9/2009 Dinker .................... G06F 16/27

FOREIGN PATENT DOCUMENTS

| KR | 10-1420754 | 7/2014 |
| KR | 10-2016-0148333 | 12/2016 |

OTHER PUBLICATIONS

Björling, Matias et al., "LightNVM: The Linux Open-Channel SSD Subsystem", USENIX Association, Proceedings of the 15th USENIX Conference on File and Storage Technologies, 2017, 359-373.

* cited by examiner

*Primary Examiner* — Kalpit Parikh
(74) *Attorney, Agent, or Firm* — Perkins Coie LLP

(57) ABSTRACT

Provided is a memory system coupled to a plurality of hosts each including an FTL. The memory system may include: a controller suitable for allowing only a write request to be received from any one of the plurality of hosts, when a write lock for a write request from the any one host is set; and a memory device controlled by the controller, and suitable for performing a write operation according to the write request from the any one host, wherein the controller includes: a lock manager suitable for setting a write lock depending on whether a lock is set in the memory device, and releasing the write lock when the write operation is completed; and a sync manager suitable for controlling synchronization of FTL metadata of the FTLs of the other hosts excluding the any one host, according to whether the write operation is successfully performed.

17 Claims, 14 Drawing Sheets

ମEMORY SYSTEM AND OPERATION
METHOD THEREOF

CROSS-REFERENCE TO RELATED
APPLICATION

This patent document claims the priority and benefits of Korean Patent Application No. 10-2019-0005162 filed on Jan. 15, 2019, which is incorporated herein by reference in its entirety.

TECHNICAL FIELD

Exemplary embodiments relate to a memory system and an operation method thereof.

BACKGROUND

The computer environment paradigm has shifted to cloud computing and is progressing towards ubiquitous computing, which enables computing systems to be used anytime and anywhere. The use of portable electronic devices such as mobile phones, digital cameras, and laptop computers has rapidly increased. These portable electronic devices generally use a memory system having one or more memory devices for storing data. Such a memory system may be used as a main memory device or an auxiliary memory device of a portable electronic device.

Memory systems using semiconductor memory devices provide advantages such as excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

The embodiments of this patent document relate to a computing environment with improved performance characteristics. In some embodiments, the disclosed systems and operating methods are implemented to support synchronization of host metadata such as flash translation layer (FTL) metadata to keep a plurality of hosts sharing a memory system updated on changes in the FTL associated with the memory system.

In an embodiment, there is provided a memory system. The memory system may include: a plurality of storage areas, each accessible by a plurality of hosts; a memory to store executable instructions for adapting a file system to constraints imposed by the plurality of storage areas; and a processor in communication with the memory, the executable instructions upon execution by the processor cause the processor to: receive a request for an operation from one of the hosts to access at least one of the plurality of storage areas; set, upon a determination that there is no current lock on the at least one storage area to be accessed, a lock for the at least one storage area to be accessed; update file system metadata to match file system metadata used by the one of the hosts accessing the at least one storage area; and update a version value of the file system metadata associated with the at least one storage area.

In an embodiment, there is provided a memory system. The memory system may include: a plurality of storage areas, each accessible by a plurality of hosts; a memory to store executable instructions for adapting a file system to constraints imposed by the plurality of storage areas; and a processor in communication with the memory, the executable instructions upon execution by the processor cause the processor to: receive, from one of the hosts, a request for accessing at least one of the plurality of storage areas, the request including a lock request for the at least one of the plurality of storage areas; determine whether there is a conflict between the lock request and another lock that is currently set by another one of the hosts; and set, upon a determination that there is no conflict, a lock for the at least one storage area.

In an embodiment, there is provided a memory system which is coupled to a plurality of hosts each including a flash translation layer (FTL). The memory system may include: a controller suitable for allowing only a write request to be received from any one of the plurality of hosts, when a write lock for a write request from the any one host is set; and a memory device controlled by the controller, and suitable for performing a write operation according to the write request from the any one host, wherein the controller includes: a lock manager suitable for setting a write lock depending on whether a lock is set in the memory device, when the write lock request is received, and releasing the write lock when the write operation is completed; and a sync manager suitable for controlling synchronization of FTL metadata of the FTLs of the other hosts excluding the any one host, according to whether the write operation is successfully performed.

In an embodiment, there is provided an operation method of a memory system which is coupled to a plurality of hosts each including an FTL. The operation method may include: setting a write lock depending on whether a lock is set in a memory device, when receiving a write lock request from any one host of the plurality of hosts; receiving only a write request from the any one host when the write lock is set, and performing a write operation according to the write request; releasing the write lock when the write operation is completed; and controlling synchronization of FTL metadata of the FTLs of the other hosts excluding the any one host, according to whether the write operation is successfully performed.

DETAILED DESCRIPTION

The technology disclosed in this patent document can be implemented in embodiments to provide electronic systems and methods that, among other features and benefits, support synchronization of host metadata of multiple hosts that share memory systems.

Figure 1:
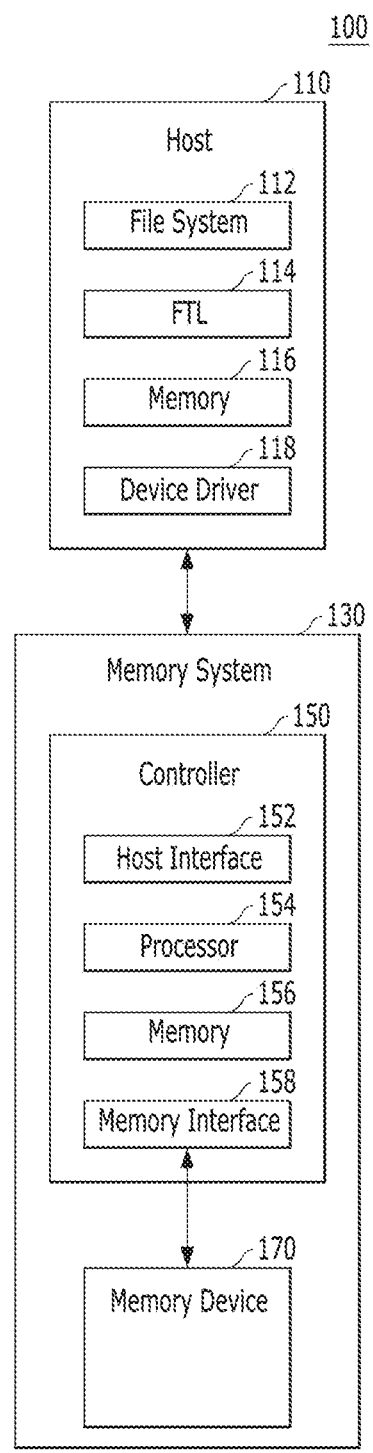
FIG. 1 schematically illustrates an example of a computing environment 100 that provide multiple users access to a shared memory system.

FIG. 1 schematically illustrates an example of a computing environment 100 that provide multiple users access to a shared memory system.

In the computing environment 100, a host 110 communicates with a memory system 130. In some implementations, the host 100 may use the memory system 130 as its data storage.

Examples of the host 110 may include wireless electronic devices (e.g., portable electronic devices) such as mobile phones, MP3 players and laptop computers or wired electronic devices such as desktop computers, game machines, TVs and projectors.

The memory system 130 may store data upon request by the host 110. The memory system 130 may serve as a main or secondary memory device of the host 110. The memory system 130 may include one or more types of storage devices. The computing environment 100 may also provide a host interface protocol for the host 110 to interface with other devices including the storage devices.

The memory system 130 may include a memory device 170 and a controller 150 for controlling the memory device 170. The memory device 170 may indicate data storage areas that can be accessed by hosts so that the hosts can store data temporarily or persistently in the memory device 170.

The memory device 170 may include non-volatile memory devices such as flash memory devices. The flash memory may store data in memory cell transistors constituting a memory cell array. In some implementations, the flash memory may be NAND flash memory devices. The flash memory may be organized into a hierarchical structure of die, plane, block and page. In an implementation, the flash memory may include a plurality of dies, and each die may receive one command at a time. Each die may include a plurality of planes, and the plurality of planes may process, in parallel, commands received by the die. Each of the planes may include a plurality of blocks. In some implementations, erase operations are performed on a block basis, and program (write) operations and read operations are performed on a page basis.

The flash memory may provide high read speed. However, since the flash memory does not support an overwrite operation, a program operation needs to be preceded by an erase operation in order to write data to the flash memory. When the memory system 130 including the flash memory is used by the host 110, a file system controls how data is stored and retrieved to and from the memory system 130. Hard disk drives have been key storage devices, and thus file systems for hard disk drives are being used as general-purpose file systems. Memory systems having flash memory devices can utilize such general-purpose file systems, but they are suboptimal for several reasons, such as erasing blocks and wear leveling. For example, as discussed above, flash memory blocks need to be erased before they can be written to, and thus the memory systems having flash memory devices need to have information associated with erasing blocks, which hard disk drives do not need. Therefore, a flash translation layer (FTL) may be used between the general-purpose file system and the flash memory. In some implementations, when data stored in a certain block of a flash memory device is to be updated, the FTL writes a new copy of the changed data to a fresh block (e.g., erased block) and remap addresses associated with the write operation. In order to write data to the flash memory, the FTL may also map a logical address of the file system to a physical address of the flash memory.

The controller 150 may include a host interface 152, a processor 154, a memory 156, and a memory interface 158.

The host interface 152 may support interfacing between the host 110 and the memory system 130. The host 110 and the memory system 130 may be electrically coupled through a port, for example. The host interface 152 may receive a command from the host 110 and transfer the command to the host 110, using an interface protocol such as PCI-E (Peripheral Component Interconnect-Express), SAS (Serial-attached SCSI) or SATA (Serial Advanced Technology Attachment), for example. The host interface 152 may support data input/output between the host 110 and the memory system 130.

The memory 156 may also store data associated with the operations of the memory system 130. In some implementations, the memory 156 may store executable instructions. The memory 156 may include a buffer or a cache to store such data.

The memory interface 158 may support interfacing between the controller 150 and the memory device 170. When the memory device 170 is a flash memory, the memory interface 158 may generate a control signal for controlling the memory device 170 and transfer the generated control signal to the memory device 170, and the processor 154 serving as a flash controller can manage the flow of the control signal. The memory interface 158 may support data input/output between the controller 150 and the memory device 170.

The memory interface 158 may include an ECC encoder and an ECC decoder (not illustrated). The ECC encoder may add a parity bit to data to be programmed to the memory device 170, and the ECC decoder may detect and correct one or more erroneous data bits read from the memory device 170 using the parity bit.

The processor 154 may control overall operations of the memory system 130.

In an implementation, the host interface 152 and the memory interface 158 may be loaded to a running system including the memory 156 and the processor 154. For another example, the host interface 152 and the memory interface 158 may be implemented as a hardware device such as a field programmable gate array (FPGA).

In some embodiments of the disclosed technology, the memory system 130 may be implemented in various platforms such as host-based solid-state drive (SSD) and an open-channel SSD. It should be noted that in the context of this patent document, the term "open-channel SSD" can indicate any data storage device that is shared by multiple hosts. With the open-channel SSD, internal information such as information regarding channels and memory spaces is exposed to the host 110 such that the host 110 can efficiently use resources of the open-channel SSD. For example, the internal information may include information relating to the hierarchical structure such as a die, plane, block and page.

The host 110 using the open-channel SSD as a storage device may include an FTL to access the memory device 170 by directly translating a logical address of the file system into a physical address of the memory device 170 based on the internal information. In this patent document, metadata of the FTL may be referred to as FTL metadata. The FLT metadata may include an address mapping table to store the mapping between physical addresses and logical addresses, and block status information indicating whether each of the blocks is an open block.

In some implementations, before writing data to a physical block address, the host 110 may control the memory device 170 of the open-channel SSD 130 to temporarily store data in an internal memory based on the internal information and the FTL metadata until the size of the write data reaches one page size. Subsequently the host 110 maps a logical address to the corresponding physical address, and sends a write request to the open-channel SSD.

As mentioned above, the term "open-channel SSD" can indicate any data storage device that is shared by multiple hosts. Examples of the open-channel SSD may include any memory system that discloses its FTL metadata to any host 110 in communication therewith.

The memory system 130 based on some embodiments may be an open-channel memory system. The host 110 using the memory system 130 as a storage device may include a file system 112, an FTL 114, a memory 116, and a device driver 118. It should be noted that in the context of this patent document, the term "open-channel memory system" can indicate any data storage device that is shared by multiple hosts.

As discussed above, a file system controls how data is stored and retrieved to and from the memory system. As an example, the file system 112 may manage data structures of an operating system (OS). The file system 112 may designate the physical location where data to be stored in the memory system 130 based on a logical address.

As described above, the FTL 114 may generate address mapping information associated with the mapping between a logical address and a physical address based on FTL metadata. The FTL 114 may translate the logical address of the file system 112 into the physical address of the memory system 130 based on the FTL metadata.

The FTL 114 may generate a read command and a write command in order to control a foreground operation of the memory device 170.

The FTL 114 may perform a background operation related to the memory device 170. The FTL 114 may perform a garbage collection operation by copying data in valid pages of memory blocks into a free block and erasing those memory blocks.

Semiconductor memory devices such as NAND flash wear out if data is written too often to the same address. The FTL 114 may implement wear leveling to ensure that data erasures and writes are distributed evenly across the storage medium. Furthermore, the FTL 114 may perform the address mapping while performing bad block management such that the host 110 does not access a bad block.

The memory 116 may store operation data of the host 110. For example, the memory 116 may store the FTL metadata of the memory device 170 for an operation of the FTL 114.

The device driver 118 may control the memory system 130 coupled to the host 110. For example, the device driver 118 may transfer a command generated by the FTL 114 to the memory system 130 to control read and write operations of the memory device 170. The device driver 118 may support data input/output between the host 110 and the memory system 130 using an interface protocol such as the host interface 152.

In an implementation, the file system 112, the FTL 114 and the device driver 118 may be loaded to a running system including the memory 116 of the host 110 and a processor (not illustrated) of the host 110. For another example, the file system 112, the FTL 114 and the device driver 118 may be implemented as a hardware device such as an FPGA.

Figure 2:
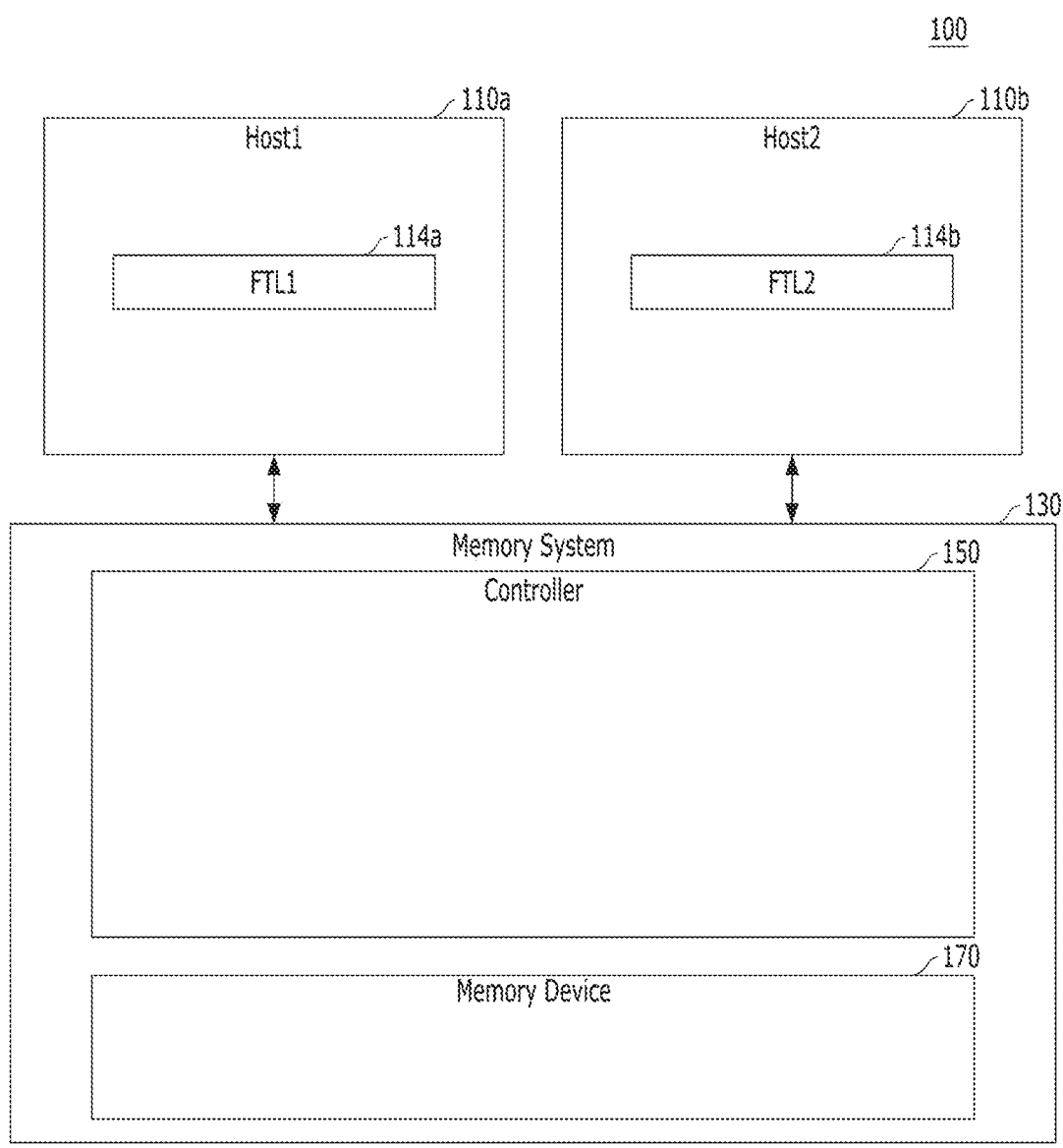
FIG. 2 schematically illustrates an example of a computing environment 100 including an open-channel memory system to support multi-ports.

FIG. 2 schematically illustrates an example of a computing environment 100 including an open-channel memory system to support multi-ports.

The computing environment 100 may include a memory system 130 and a plurality of hosts. The memory system 130 may include a controller 150 and a memory device 170.

In an implementation, the memory system 130 may be an open-channel memory system that supports multi-ports interface.

Since the memory system 130 supports multi-ports, each of a plurality of processors may independently communicate through the corresponding one or more ports, and share resources of the memory system 130.

For example, the memory system 130 may support dual ports interface. As shown in FIG. 2, a first host 110a and a second host 110b may communicate through one of dual ports, respectively, and share the resources of the memory system 130.

Since the memory system 130 is an open-channel memory system, each of the first and second hosts 110a and 110b may access a physical address of the memory device 170. In order for each of the first and second hosts 110a and 110b to access the memory device 170 through address translation, the first host 110a may include a first FTL 114a, and the second host 110b may include a second FTL 114b.

When the FTL of the first host 110a maps a logical address to a physical address to write data to the memory system 130, a part of FTL metadata may be updated to reflect the mapping. In this patent document, updating the FTL metadata may include updating the address mapping table. In a situation where the mapping by the first host 110a causes the FTL metadata to be updated, the second host 110b will end up with wrong address mapping unless the updated FTL metadata is reflected in the internal FTL metadata of the second host 110b.

In an embodiment of the disclosed technology, the memory system 130 may control the plurality of hosts such that read requests or write requests from different hosts can be executed at different timings. In some embodiments of the disclosed technology, the memory system 130 may maintain a read lock and/or a write lock to prevent concurrent access to the memory system 130 by multiple hosts. For example, when a write lock request is received from the first host 110a of the plurality of hosts, the memory system 130 may set a write lock based on a lock status of the memory device 170, receive a write request from the first host 110a, and perform a write operation.

When the write lock is set, the memory system 130 may block a write or read lock request until the write lock is released, even if the write or read lock request is received from the second host 110b. When the write operation is completed, the memory system 130 may release the write lock, and synchronize the internal FTL metadata of the plurality of hosts with the memory system 130. For example, when the write operation is completed and the memory system 130 releases the write lock associated with the first host 110a, the memory system 130 synchronizes FTL metadata (e.g., address mapping table) of all other hosts with the updated metadata of the first host 110a (the updated metadata of the memory system 130.

In this way, the memory system 130 can prevent the plurality of hosts from performing write operations at the same time or performing write and read operations at the same time. Furthermore, the memory system 130 may can prevent the plurality of hosts from having different metadata (e.g., different mapping table) by synchronizing the FTL metadata of the respective hosts. For example, the memory system 130 may prevent the hosts from reading unintended data from wrong address or performing a write operation on a wrong memory region in which data is already written, thereby improving the reliability of the computing environment 100.

Figure 3:
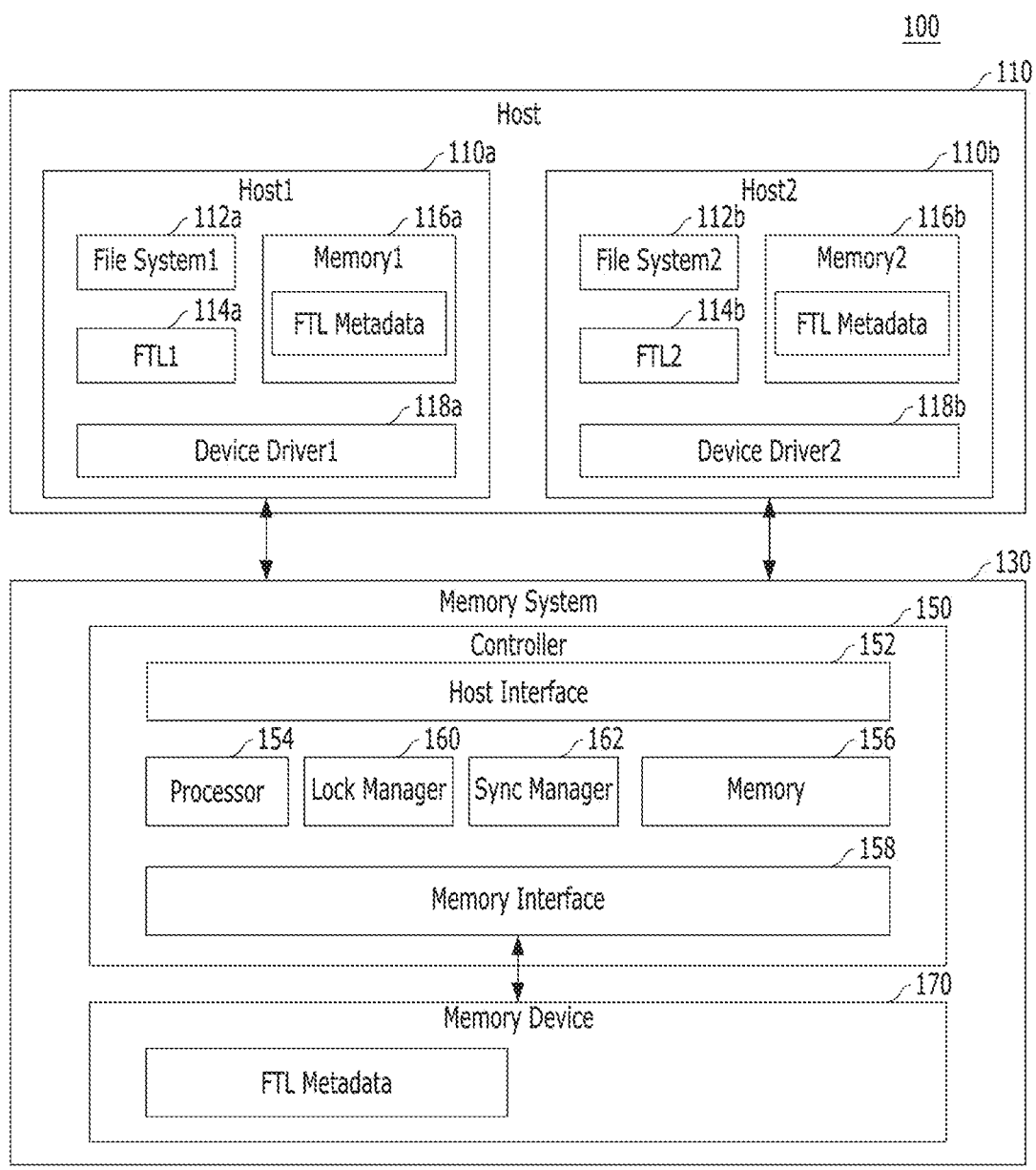
FIG. 3 schematically illustrates a structure of a computing environment 100 based on an embodiment.

FIG. 3 schematically illustrates a structure of a computing environment 100 based on an embodiment.

The computing environment 100 may include a memory system 130 and a plurality of hosts coupled to the memory system 130. For convenience of description, FIG. 3 illustrates the memory system 130 as being in communication with only first and second hosts 110a and 110b.

The first host 110a may include a first file system 112a, a first FTL 114a, a first device driver 118a and a first memory 116a. The elements illustrated in FIG. 3 may be identical or similar to those illustrated in FIG. 1. In this sense, the first file system 112a, the first FTL 114a, the first memory 116a and the device driver 118a may correspond to the file system 112, the FTL 114, the memory 116, and the device driver 118, respectively, which are illustrated in FIG. 1.

The first memory 116a may store operation data of the first host 110a. Specifically, the first memory 116a may store FTL metadata for address translation of the first FTL 114a. The first file system 112a, the first FTL 114a and the first device driver 118a may be loaded to the first memory 116a and/or a processor (not illustrated) in the first host 110a.

The second host 110b may include a second file system 112b, a second FTL 114b, a second device driver 118b and a second memory 116b. As mentioned above, the elements illustrated in FIG. 3 may be identical or similar to those illustrated in FIG. 1. In this sense, the second file system 112b, the second FTL 114b, the second memory 116b and the second device driver 118b may correspond to the file system 112, the FTL 114, the memory 116 and the device driver 118, respectively, which are illustrated in FIG. 1.

The memory system 130 may be an open-channel memory system capable of supporting multi-ports. The memory system 130 may include a memory device 170 and a controller 150 for controlling the memory device 170.

In an implementation, the controller 150 may include a host interface 152, a processor 154, a memory 156, a memory interface 158, a lock manager 160 and a sync manager 162. The host interface 152, the processor 154, the memory 156 and the memory interface 158 may correspond to those illustrated in FIG. 1.

In an implementation, the memory device 170 may correspond to that illustrated in FIG. 1. The memory device 170 may store FTL metadata. The memory device 170 may store FTL metadata in which current address mapping information and block status information of the memory device 170 are reflected. The memory device 170 may be a nonvolatile memory device which can retain the FTL metadata even when power supply is interrupted.

In an implementation, the lock manager 160 may set a write or read lock in the memory device 170 based on a lock request of each of the hosts. When a write lock is set by a certain host, the controller 150 may allow only a write request of the corresponding host. When a read lock is set by a certain host, the controller 150 may allow only a read request of the corresponding host.

In an implementation, the lock manager 160 may set only one write lock in the same memory region of the memory device 170. That is, the lock manager 160 may control a plurality of write operations not to be performed on the same memory region at the same time.

In an implementation, the lock manager 160 may not set a read lock and a write lock in the same memory region at the same time. That is, the lock manager 160 may control a write operation and a read operation not to be performed on the same memory region at the same time.

In another implementation, the lock manager 160 may set two or more read locks in the same region at the same time. That is, the lock manager 160 may allow a plurality of read operations to be performed on the same memory region at the same time.

In an embodiment, the memory region may correspond to the entire memory device 170. That is, the lock manager 160 may control the memory system 130 such that another write operation and another read operation are not performed in the memory device 170 at the same time, while a certain write operation is performed in the memory device 170. As will be discussed below with reference to FIGS. 4A to 6B, the lock manager 160 may set a write or read lock to the entire memory device 170 based on a lock request of a certain host.

In an embodiment, the memory device 170 may include a plurality of memory regions. For example, when a memory region corresponds to one memory block of the memory device 170 and a write operation is being performed on a certain memory block of the memory device 170, the lock manager 160 may control the memory device 170 such that another write operation and another read operation cannot be performed on the same memory block of the memory device 170 but can be performed on another memory block of the memory device 170. As will be discussed below with reference to FIG. 7, the lock manager 160 may set a write or read lock for each region of the memory device 170.

The sync manager 162 may control the synchronization of FTL metadata of the plurality of hosts and the memory system 130. For example, when a write lock is released after a write operation of the memory system 130 has been completed in response to a write request of the first host 110a, the sync manager 162 may transfer a write lock release signal to the plurality of hosts. In some implementations, the sync manager 162 may transfer the updated FTL metadata to the second host 110b.

Figure 4A:
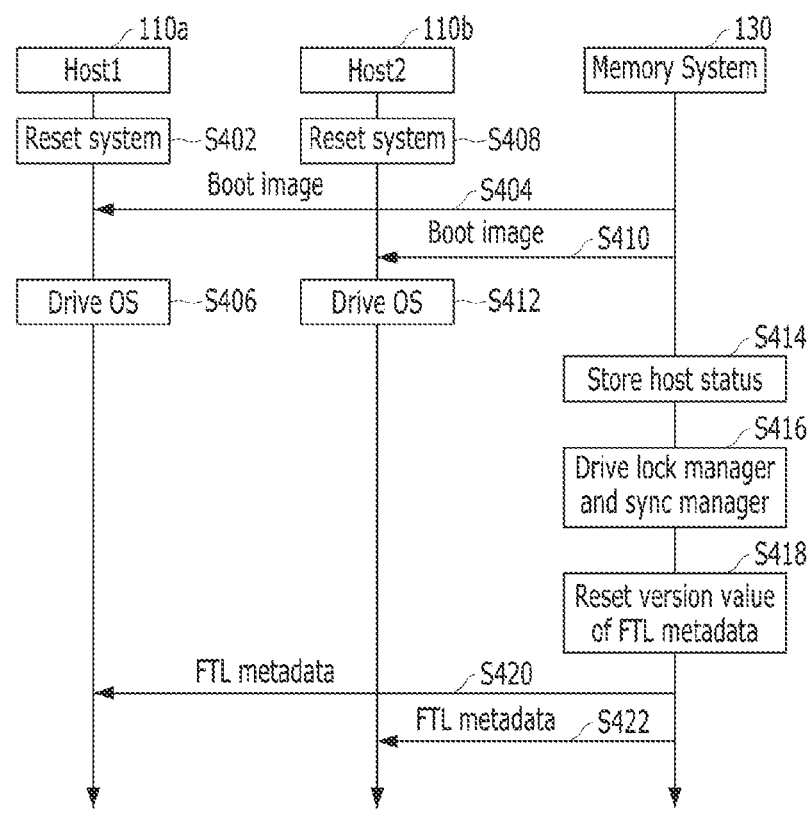
FIGS. 4A and 4B show a booting operation of a memory device and multiple hosts in communication with the memory device based on some embodiments.
Figure 4B:
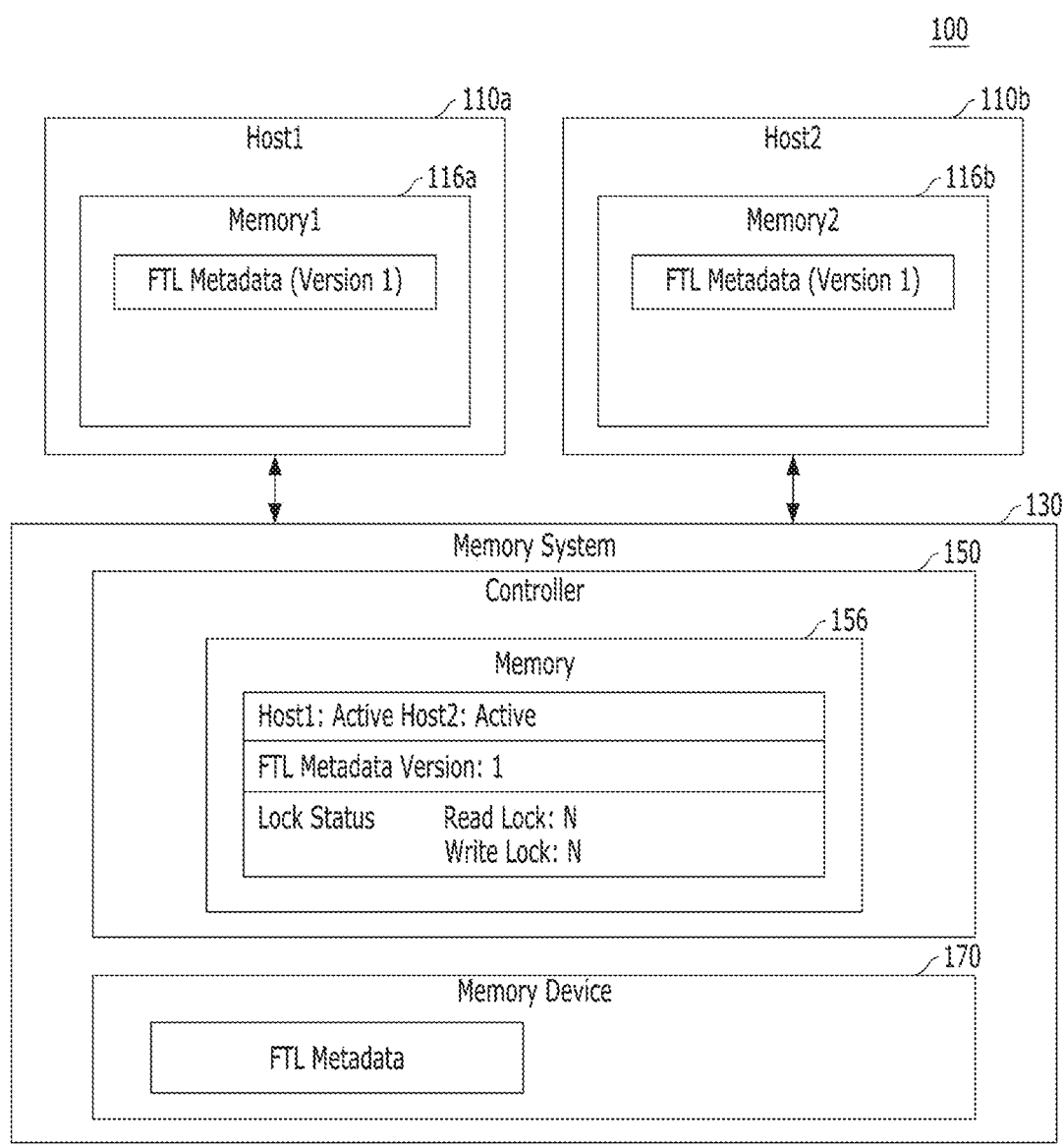

FIGS. 4A and 4B illustrate a booting operation of the memory system 130, the first host 110a, and the second host 110b based on some embodiments of the disclosed technology.

FIG. 4A is a flowchart illustrating a booting operation of the memory system 130, the first host 110a, and the second host 110b shown in FIG. 3.

FIG. 4B schematically illustrates initial data which can be stored in the memory system 130, the first host 110a, and the second host 110b shown in FIG. 3. Specifically, FIG. 4B illustrates data that can be stored in the first memory 116a included in the first host 110a, the second memory 116b included in the second host 110b, the memory 156 included in the controller 150 of the memory system 130, and the memory device 170. The other components that can be included in the computing environment 100 are omitted from FIG. 4B.

Referring to FIG. 4A, when the first host 110a is powered on at step S402, its internal system is reset based on a command included in a boot loader stored in an internal read-only memory (ROM) (not illustrated). The first host 110a may check whether communication between the first host 110a and the memory system 130 is successfully established.

At step S404, the first host 110a may receive a boot image from a nonvolatile storage, for example, the memory system 130. The boot image may indicate a computer file that allows the associated hardware to boot. For example, the boot image may include a command and data used to boot the first file system 112a, the first FTL 114a, and the first device driver 118a.

At step S406, a processor (not illustrated) of the first host 110a may run an operating system (OS) based on a command included in the boot image. The OS may include the first file system 112a, the first FTL 114a and the first device driver 118a, which are shown in FIG. 3.

Similarly to the operation of the first host 110a at steps S402 to S406, the second host 110b may reset the internal system, receive a boot image from the memory system 130, and run an OS including the second file system 112b, the second FTL 114b and the second device driver 118b based on the received boot image, at steps S408 to S412.

At step S414, the memory system 130 may store, in the memory 156, host information associated with a host that is currently using the memory system 130, based on host information received from the first and second hosts 110b.

At step S416, the memory system 130 may operate internal components such as the lock manager 160 and the sync manager 162. For example, the host interface 152, the memory interface 158, the lock manager 160 and the sync manager 162 may be implemented as firmware and the firmware operations can be performed by the processor 154.

At step S418, the memory system 130 may reset a version value of the FTL metadata stored in the memory device 170.

The version value of the FTL metadata may be used to synchronize the FTL metadata updated by the respective hosts. Each of the hosts may compare a version value of the FTL metadata stored in the internal memory to the version value stored in the memory 156 to check as to whether the FTL metadata of the host is the latest version. When the FTL metadata of the host is not the latest version, the synchronization is needed to update the FTL metadata to the latest version.

As shown in FIG. 4B, the memory system 130 is aware of: whether the first host 110a or second host 110b is activated; and the version value of the FTL metadata after reset, based on host status information (e.g., "Active," and "Version 1") in the memory 156. A lock status may indicate whether a read lock and a write lock are set in the memory system 130.

As shown in FIG. 4A, the memory system 130 may transfer the FTL metadata stored in the memory device 170 and the version value of the FTL metadata to the first and second hosts 110a and 110b at steps S420 and S422.

As shown in FIG. 4B, the first and second memories 116a and 116b may store the FTL metadata received from the memory system 130, along with the version value of the FTL metadata.

After the booting operation described with reference to FIGS. 4A and 4B is performed, the FTL metadata of the respective hosts in communication with the memory system 130 may be synchronized as described below with reference to FIGS. 5A to 7.

FIGS. 5A to 5D show how write operations of the first and second hosts 110a and 110b are performed based on some embodiments of the disclosed technology.

Figure 5A:
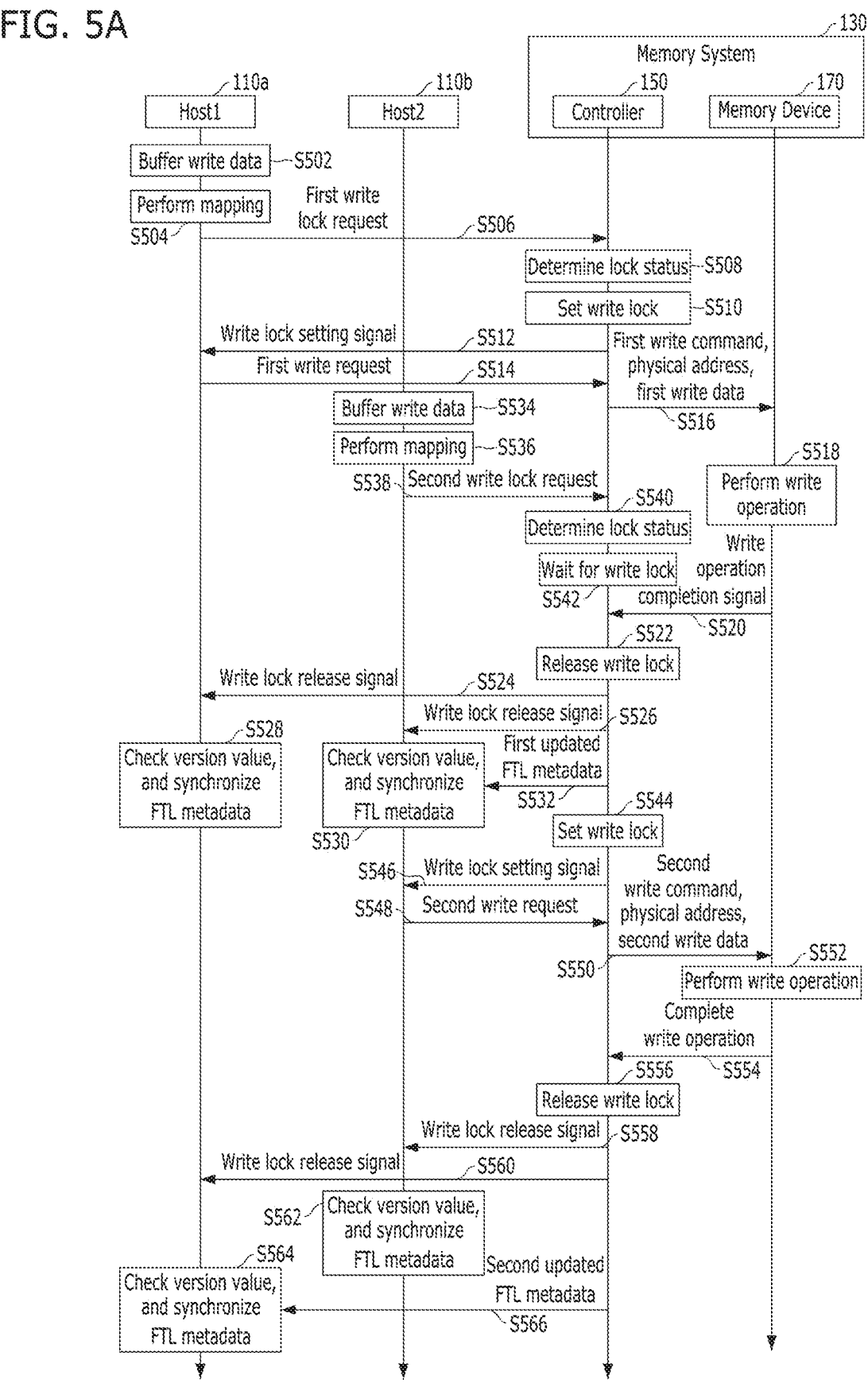
FIGS. 5A to 5D show how to write operations of multiple hosts are performed based on some embodiments.

As shown in FIG. 5A, at step S502, when write data is generated in the first host 110a, a write buffer of the first memory 116a holds write data before starting a write operation to the memory system 130. For convenience of description, write data generated by the first host 110a is hereinafter referred to as first write data.

In an implementation, a host may perform write operations on a certain data size basis, and thus a write buffer of the host holds write data until it reaches the certain data size. In another implementation, the memory system 130 may have a write data buffer to temporarily store write data before a write operation to a main storage area. When the size of the first write data in the write buffer reaches the size enough to perform a write operation, the first FTL 114a may generate first address mapping information by mapping the logical address of the first write data to a physical address to which the first write data is to be written, at step S504. In some implementations, the data size for the write operation to the memory system 130 may be one page of the memory device 170. In some other implementations, the data size for the write operation to the memory system 130 may be selected based on the number of blocks included in a super block, the number of pages that can be programmed through one-shot program, and the size of the one page.

In some implementations, when an open block is closed and the first write data is to be written to a new open block, the first FTL 114a may update the block status information.

At step S506, the first FTL 114a may transfer a first write lock request to the memory system 130 through the first device driver 118a.

At step S508, the lock manager 160 of the memory system 130 may determine the lock status of the memory device 170 in response to the first write lock request. The lock manager 160 may access the memory 156 to determine the lock status.

When the determination result of step S508 indicates that any one of a read lock and a write lock is already set, the memory system 130 may not set a write lock in response to the first write lock request, until the lock is released. The operation when the memory system 130 receives the write lock request while the lock is set will be described in detail at steps S534 to S566.

When the determination result of step S508 indicates that there is no read lock or write lock that is currently set, the lock manager 160 may set a write lock to perform a first write operation at step S510. Once the write lock is set in response to a write lock request from the first host 110a, the controller 150 may allow only a write request to be received from the first host 110a.

At step S512, the lock manager 160 may transfer a write lock setting signal, which indicate the write lock has been set, to the first host 110a through the host interface 152.

At step S514, the first FTL 114a may transfer a first write request, which requests the memory system 130 to write the first write data to the memory device 170, to the memory system 130 through the first device driver 118a.

In an implementation, the first write request may include a first write command, the first write data and first updated FTL metadata. The first updated FTL metadata may indicate a part of the FTL metadata of the first host 110a, which has been updated to write the first write data. The first updated FTL metadata may include the first address mapping information. For example, the first address mapping information may include a mapping table that has been updated by the first host 110a executing the first write request. When the block status information is updated, the first updated FTL metadata may also include the updated part of the block status information.

At step S516, the processor 154 may transfer the first write command, a physical address included in the first updated FTL metadata, and the first write data to the memory device 170 through the memory interface 158.

Figure 5B:
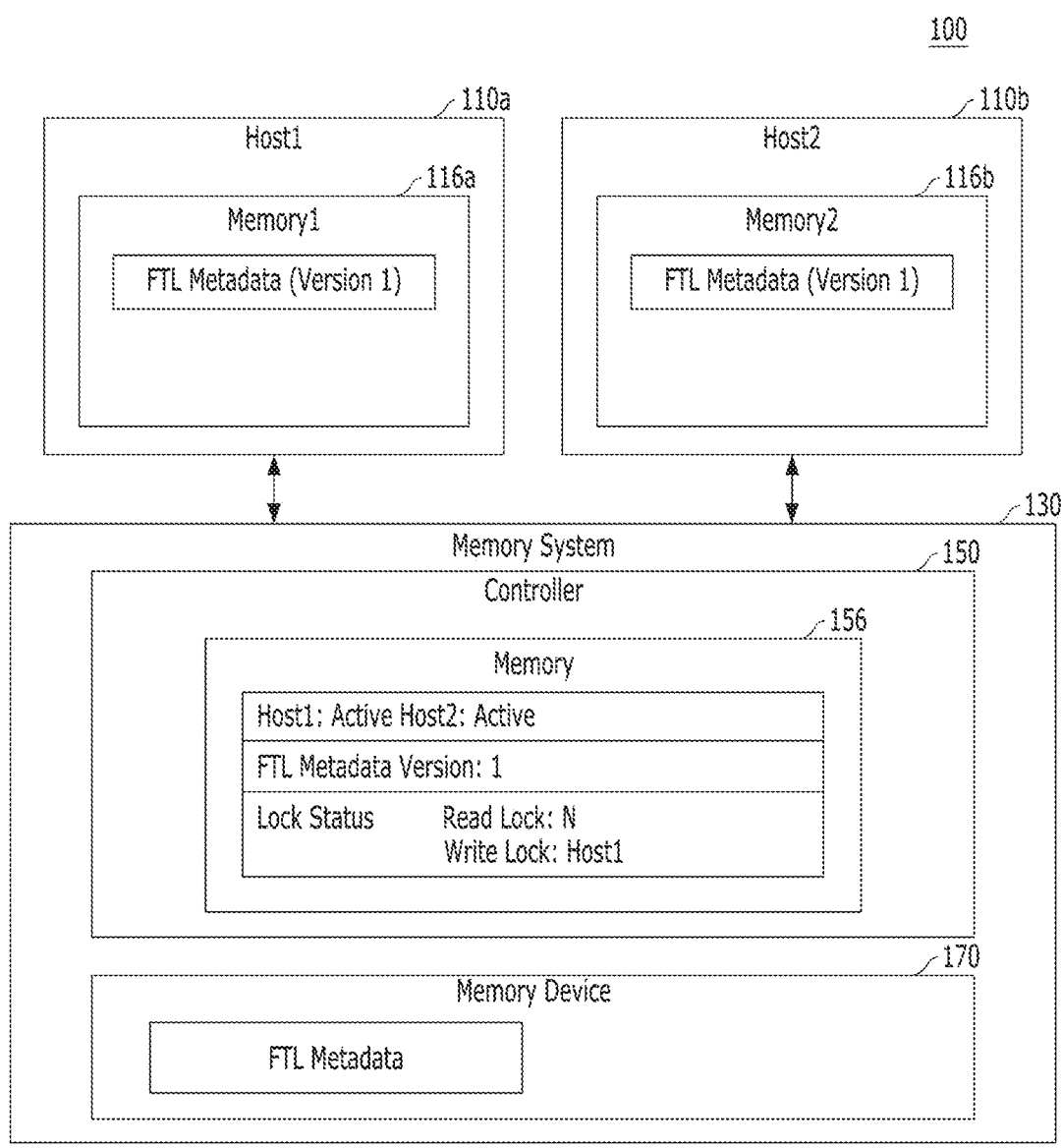

As shown in FIG. 5B, after the operation of steps S502 to S516, a write lock is set by the first host 110a, and the version value of the FTL metadata is set to 1. Since the first write operation is not yet performed, the first updated FTL metadata of the memory system 130 has not been updated even though the first updated FTL metadata was received. The internal FTL metadata of the first and second memories 116a and 116b may also have a version value of 1.

At step S518, the memory device 170 may write the first write data to the physical address in response to the first write command.

When the first write operation is completed, the memory device 170 may transfer a write operation completion signal to the controller 150 through the memory interface 158 at step S520. Examples of the write operation completion signal may include a write operation success signal and a write operation fail signal.

When the controller 150 receives the write operation success signal, the sync manager 162 may reflect the first updated FTL metadata into the FTL metadata stored in the memory device 170 and update the version value of the FTL metadata stored in the memory 156.

Figure 5C:
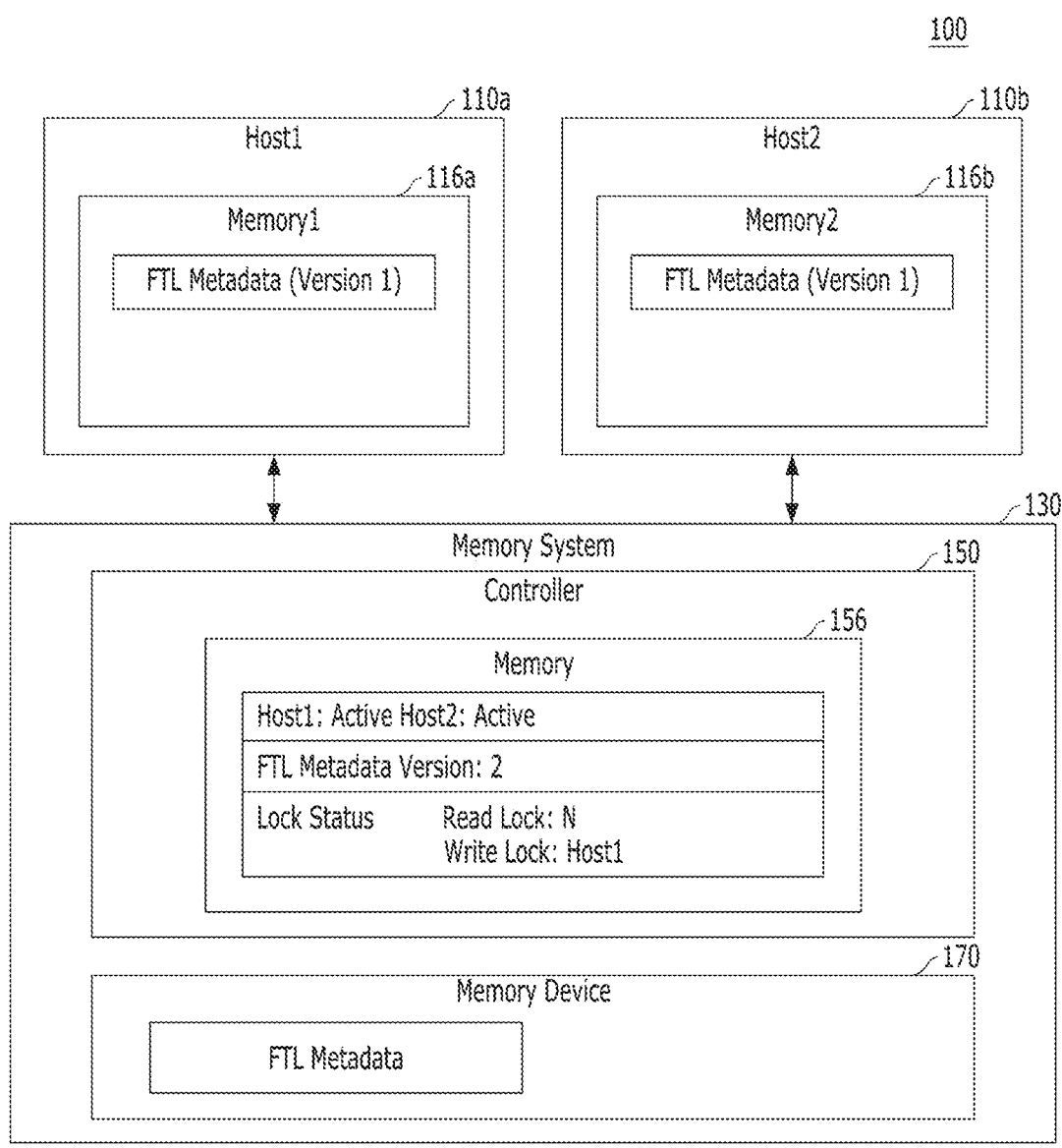

As shown in FIG. 5C, when step S518 is performed, the FTL metadata stored in the memory device 170 is updated and the version value of the FTL metadata is updated. In some implementations, the version value of the FTL metadata stored in the first memory 116a remains unchanged at this stage.

In case the first write operation fails, the FTL metadata stored in the memory device 170 is not updated. Therefore, when the first write operation fails, the version value of the FTL metadata remains unchanged.

At step S522, the lock manager 160 may release the write lock set by the first host 110a.

At steps S524 and S526, the lock manager 160 may transfer a write lock release signal, which indicates the write lock has been released, to the first and second hosts 110a and 111b.

At step S528, the first host 110a may determine whether the version value of the FTL metadata stored in the first memory 116a coincides with the version value of the FTL metadata stored in the memory 156, upon receipt of the write lock release signal. When the version values do not coincide with each other, the FTL metadata needs to be updated, and thus the first host 110a may cause the FTL metadata stored in the first memory 116a to be updated to the first updated FTL metadata, and may update the version value such that the version value stored in the memory 156 matches the version value stored in the first memory 116a.

At step S530, the second host 110b may determine whether the version value of the FTL metadata stored in the second memory 116b coincides with the version value of the FTL metadata stored in the memory 156, upon receipt of the write lock release signal. When the version values do not coincide with each other, the second host 110b may receive the first updated FTL metadata from the memory system 130, and may update the FTL metadata stored in the second memory 116b by reflecting the first updated FTL metadata and update the version value such that the version value stored in the memory 156 matches the version value stored in the second memory 116b, at step S532.

The address mapping information, among the FTL metadata, is frequently updated while the block status information is not updated frequently. In an embodiment, the version value of the address mapping information (e.g., version of address mapping table) and the version value of the block status information are maintained separately. In this case, the sync manager 162 may update the version value of the address mapping information and the version value of the block status information separately. The first and second hosts 110a and 110b may compare their version values of the address mapping information and the block status information to the version values stored in the memory 156, and independently synchronize their address mapping information and the block status information.

Figure 5D:
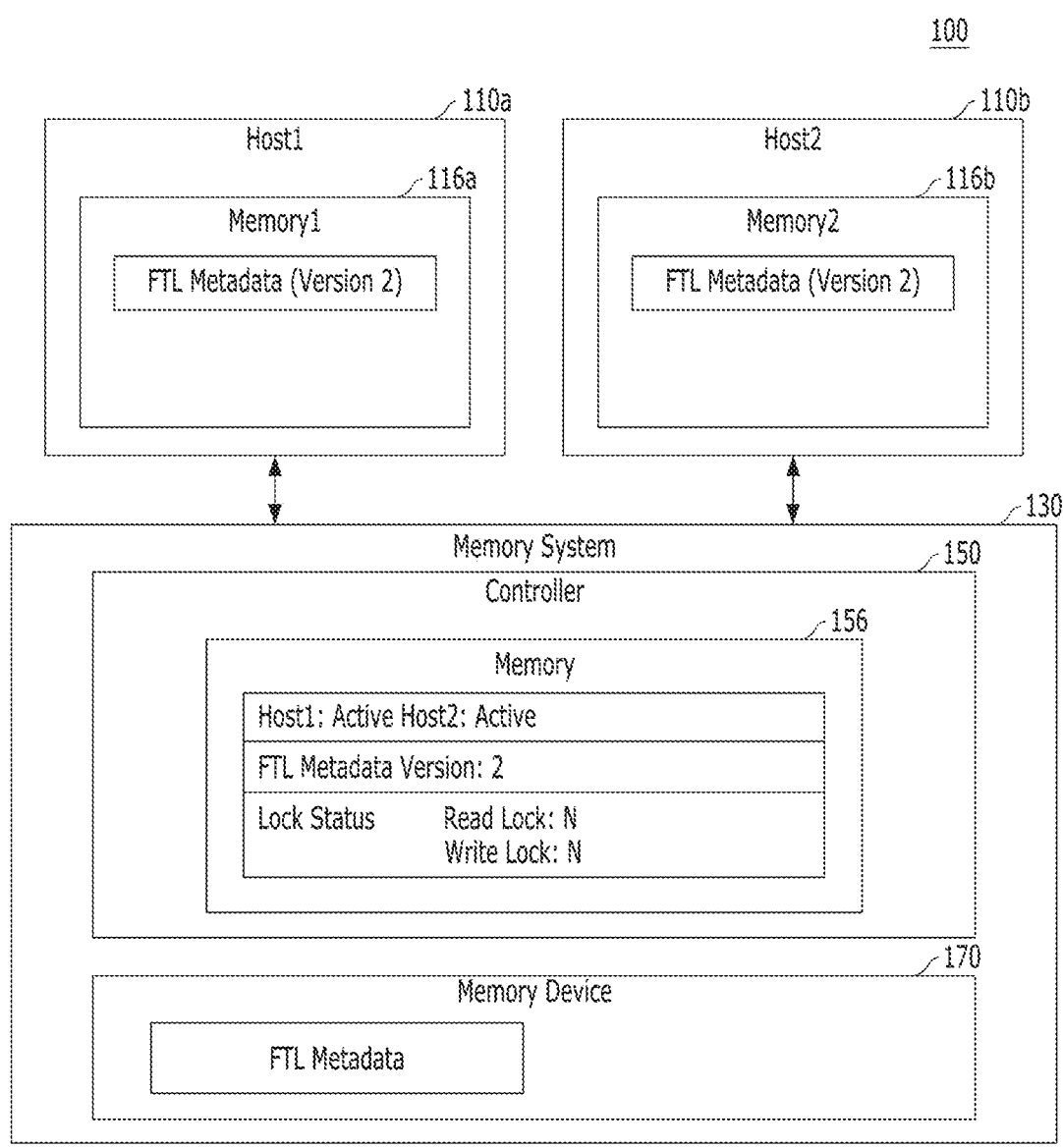

As shown in FIG. 5D, after step S532 is completed, the write lock is released, and the FTL metadata version value in the memory system 130 is updated, and the first updated FTL metadata causes the FTL metadata of the first and second memories 116a and 116b to be updated.

The second host 110b may generate second write data. At step S534, a write buffer of the second memory 116b holds the second write data before starting a write operation to the memory system 130. At step S536, the second FTL 114b may perform mapping between the logical address of the second write data and a physical address to which the second data is to be written and generate second updated FTL metadata.

At step S538, the second FTL 114b may transfer a second write lock request to the memory system 130 through the second device driver 118a.

At step S540, the lock manager 160 may determine the lock status of the memory device 170, stored in the memory 156, in response to the second write lock request. When the operation of step S538 is performed while the first host 110a and the memory system 130 are performing the operation of steps S510 to S522, the lock manager 160 may notify the second host 110b that a lock is set in the memory device 170. Thus, the second host 110b is not allowed to access the memory device 170.

In an embodiment, the lock manager 160 may queue the second write lock request in the memory 156, and the second host 110b waits until the write lock is released, at step S542.

After the write lock is released at step S522 and the signals are transferred to the respective hosts at steps S524, S526 and S532, the lock manager 160 may set a write lock in response the queued second write lock request at step S544. Since the write lock was set in response to the write lock request from the second host 110b, the controller 150 may allow only a write request to be received from the second host 110b.

At step S546, the lock manager 160 may transfer a write lock setting signal to the second host 110b through the host interface 152.

At step S548, the second host 110b may transfer a second write request to the memory system 130. In some implementations, the second write request may include a second write command, the second write data and the second updated FTL metadata. The second updated FTL metadata may indicate the FTL metadata updated at step S536. Since the FTL metadata of the second host 110b was updated at step S530, the second FTL 114b may regenerate the second updated FTL metadata by performing address mapping again, if necessary.

Steps S550 to S566 may correspond to step S516 to S532. In short, at steps S550 to S566, the memory system 130 may write the second write data to a physical address included in the second FTL metadata in response to the second write command, and may release the write lock when the write operation is completed. When the memory system 130 transfers the write lock release signal to each of the hosts, the host may synchronize the FTL metadata by comparing the version value of the FTL metadata.

In an embodiment, when the determination result of step S540 indicates that the lock is set in the memory system 130, the lock manager 160 may transfer a write lock fail signal to the second host 110b instead of queuing the write lock request at step S542. Then, the second host 110b may retransfer the second write lock request.

In an embodiment, when the determination result of step S540 indicates that the lock is set in the memory system 130, the lock manager 160 may perform the operation of step S542 or may transfer the write lock fail signal according to a predetermined standard.

For example, the lock manager 160 may perform the operation of step S542 when an estimated time required until the write lock is released is less than a threshold value, or transfer the write lock fail signal to the second host 110b when the estimated time is equal to or longer than the threshold value.

The lock manager 160 may decide a write time based on the size of the write data and the time required for garbage collection. The lock manager 160 may calculate the estimated time based on the write time, the time at which the write operation of the memory system 130 was started, and the current time.

Figure 6A:
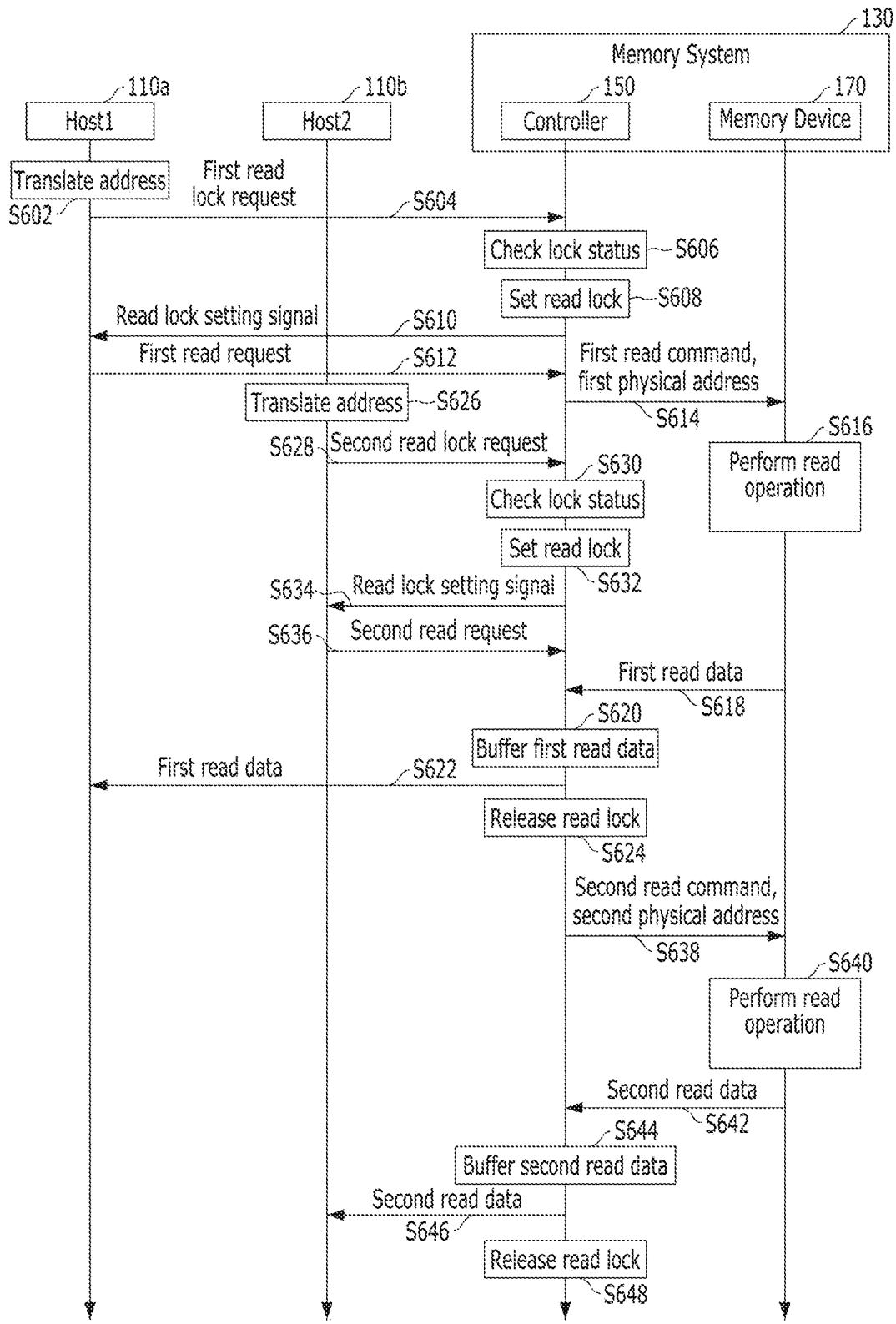
FIGS. 6A and 6B show read operations of multiple hosts based on some embodiments.
Figure 6B:
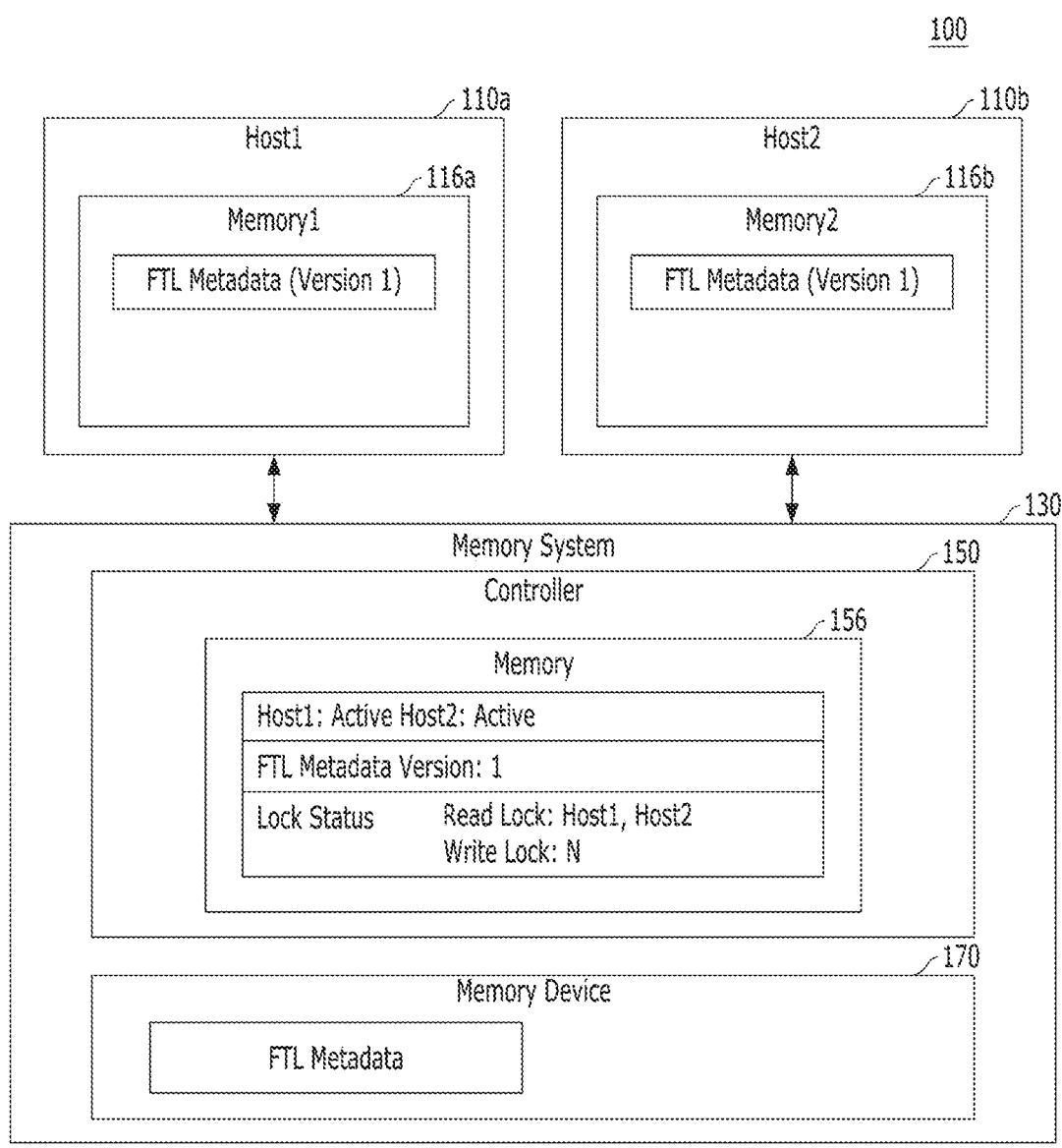

FIGS. 6A and 6B show read operations of multiple hosts based on some embodiments.

As shown in FIG. 6A, when the first file system 112a is intended to read data stored in the memory system 130, the first FTL 114a may translate the logical address of the data to be read into a physical address by referring to the FTL metadata, at step S602. For convenience of description, the physical address is hereinafter referred to as a first physical address.

At step S604, the first FTL 114a may transfer a first read lock request to the memory system 130 through the first device driver 118a.

At step S606, the lock manager 160 may determine whether a lock is set in the memory system 130 at the moment, based on the lock status of the memory 156.

When the determination result of step S606 indicates that a write lock is set in the memory system 130, the memory system 130 may not allow a read operation of the first host 110a until the write lock is released.

In an implementation, when the write lock is set in the memory system 130, the lock manager 160 may transfer a read lock fail signal to the host. In another implementation, when the write lock is set in the memory system 130, the lock manager 160 may queue the first read lock request. In yet another embodiment, the lock manager 160 may selectively perform the operation of transferring the read lock fail signal and the operation of queuing the first read lock request according to a predetermined standard. For example, the predetermined standard may include whether an estimated time required for the write lock to be released is less than a threshold value.

On the other hand, when the determination result of step S606 indicates that a read lock is set or no lock is set, the memory system 130 may set a read lock of the first host 110a in response to the first read lock request at step S608. When the read lock is set, the controller 150 may allow only a read request to be received from the first host 110a.

At step S610, the lock manager 160 may transfer a read lock setting signal, which indicates that the read lock is set, to the first host 110a through the host interface 152.

At step S612, the first FTL 114a may transfer a first read request, which requests the memory system 130 to read the data stored in the first physical address, to the memory system 130 through the first device driver 118a. The first read request may include a first read command and the first physical address.

At step S614, the processor 154 may transfer the first read command and the first physical address to the memory device 170 through the memory interface 158.

At step S616, the memory device 170 may read the first read data stored in the first physical address in response to the first read command.

When the memory device 10 successfully reads the first read data at step S616, the memory device 170 may transfer the first read data to the controller 150 at step S618.

At step S620, the memory interface 158 may buffer or temporarily store the first read data in the memory 156.

At step S622, the processor 154 may transfer the first read data to the host 110a.

At step S624, the lock manager 160 may release the read lock set by the first host 110a.

When the memory device 170 fails to read the first read data at step S616, the processor 154 may transfer a fail signal to the first host 110a, and the lock manager 160 may release the read lock set by the first host 110a at step S624.

Since multiple hosts are in communication with the same memory system, each host can generate its own read request while another read request from another host is being executed by the memory system. For example, the second host 110b may generate a second read request while a first read request of the first host 110a is being executed. At step S626, the second FTL 114b may translate the logical address into a physical address by referring to the FTL metadata. For convenience of description, the physical address is hereinafter referred to as a second physical address.

At step S628, the second device driver 118a may transfer a second read lock request to the memory system 130.

At step S630, the lock manager 160 may determine whether a lock is set in the memory system 130 at the moment, based on the lock status of the memory 156.

The second read lock request is received while the operation of steps S608 to S624 is being performed in a situation where a read lock is set by the first host 110a. Since the FTL metadata cannot be changed when the read operation is performed, the second read command operation may be performed while the first read command operation is being performed.

Thus, at step S632, the lock manager 160 may set a read lock of the second host 110b. At step S632, since the read locks of the first and second hosts 110a and 110b are set, the controller 150 may allow only read requests to be received from the first and second hosts 110a and 110b.

As shown in FIG. 6B, after the operation of step S632 is performed, the read locks of the first and second hosts 110a and 110b is set.

At step S634, the lock manager 160 may transfer a read lock setting signal to the second host 110b.

At step S636, the second FTL 114b may transfer a second read request, to the memory system 130.

In some embodiments of the disclosed technology, steps S638 to S648 may correspond to steps S614 to S624. In an implementation, at steps S638 to S648, the processor 154 may transfer a second read command and a second physical address to the memory device 170, the memory device 170 may read second read data stored in the second physical address in response to the second read command, and transfer the second read data to the controller 150 when the read operation is successfully completed. The memory interface 158 may buffer and temporarily store the second read data in the memory 156. When the processor 154 transfers the second read data to the second host 110b, the lock manager 160 may release the read lock set by the second host 110b.

For convenience of description, although the memory device 170 is illustrated as performing the second read operation of step S640 after the first read operation of step S616 is completed, the memory device 170 may perform the second read operation at the same time as the first read operation. For example, the first and second physical addresses belong to different dies, the first read operation and the second read operation can be performed in parallel, and thus the memory device 170 may perform the second read operation at the same time as the first read operation.

Some embodiments of the disclosed technology can provide an optimized performance even in a situation where more than one host try to access the same physical address. In the example discussed above, when the first read command operation is completed, the first read data, which was read out and buffered through the memory interface 158 based on the first read command, may be transferred to the second host 110b through the host interface 152 if the second physical address, which will be accessed by the queued second read command, is equal to the first physical address.

By way of example and not by limitation, FIGS. 5A and 6A illustrate that each of the hosts transfers the read or write lock request to the memory system 130 and then transfers the read or write command to the memory system 130 after receiving the lock setting signal, which indicates that the lock has been set, from the memory system 130. In other implementations, the hosts may transfer the read or write command to the memory system 130 regardless of the locking setting signal so long as the priority queue is managed in an ordered manner.

In an embodiment, each of the hosts may transfer a write command that includes the write lock request to the memory system 130. Similarly, each of the hosts may transfer a read command that includes the read lock request to the memory system 130.

For example, when the host transfers a write command along with FTL metadata and write data to the memory system 130, the memory system 130 may check the lock status. When there is no lock set for that moment, the memory system 130 may set a write lock and perform a write operation. The memory system 130 may check the lock status in response to the write command and transfer a write lock fail signal to the host when there is a lock set by another host.

Figure 7:
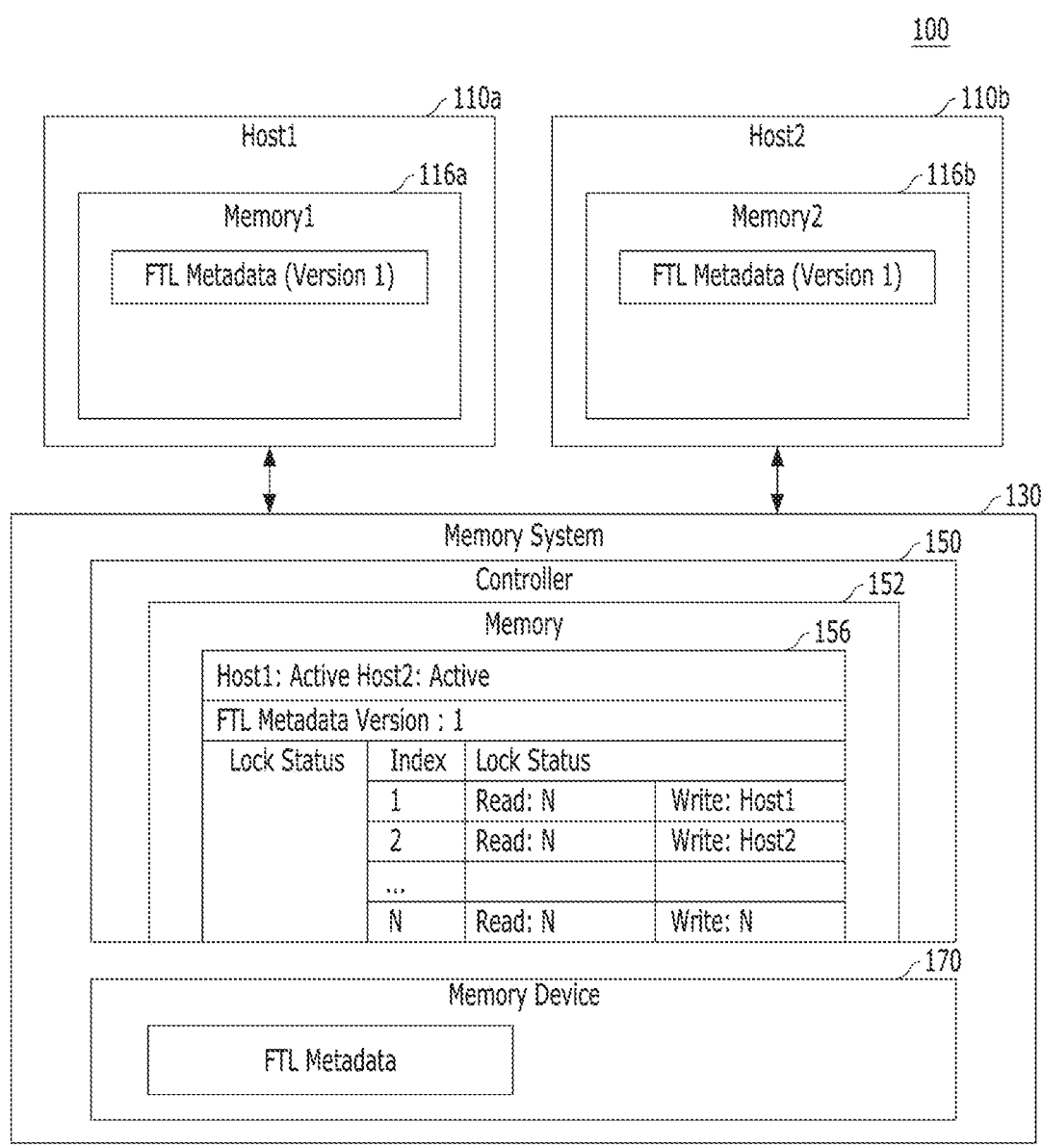
FIG. 7 schematically illustrates data that can be included in the memory device and multiple hosts based on some embodiments.

FIG. 7 schematically illustrates data that can be included in the memory device and multiple hosts based on some embodiments.

In a computing environment 100, the first and second hosts 110a and 110b may communicate with and use the memory system 130. The first and second hosts 110a and 110b may include the file systems 112a and 112b, the FTLs 114a and 114b, the memories 116a and 116b, and the device drivers 118a and 118b, respectively. The memory system 130 may include the controller 150 and the memory device 170. The controller 150 may include the host interface 152, the processor 154, the memory 156, the memory interface 158, the lock manager 160, and the sync manager 162.

The memory device 170 may include a plurality of memory regions. For example, one memory region may include one or more blocks or one or more pages.

In an embodiment, the lock manager 160 may set or release a lock for each memory region of the memory system 130. The memory 156 may store read and write lock statuses of the respective memory regions. FIG. 7 illustrates an example of the memory 156 for storing a table that includes an index field indicating the memory regions and a lock status field indicating the read and write lock statuses of the respective memory regions.

The sync manager 162 may synchronize FTL metadata of the memory system 130. In an implementation, the sync manager 162 may correspond to the sync manager 162 shown in FIG. 3. For example, when one memory region corresponds to one block, the first host 110a may generate first updated FTL metadata to write first write data to the memory system 130. When a physical address included in the first updated FTL metadata is an address within a first block, the first host 110a may transfer a first write lock request for accessing the first block of the memory device 170.

The lock manager 160 may set a write lock in response to the first write lock request when a read lock and a write lock are not set in the first block.

In some implementations, even in a case where a write lock is set on a second block by the second host, the FTL metadata of the first block is not updated. Therefore, upon a determination by the lock manager 160 that there is no lock set on the first block of the memory device 170, the lock manager 160 may set, based on the first write lock request, the write lock of the first host on the first block.

Upon successful completion of the write operation on the second block, the write lock is released, and the sync manager 162 updates the version value of the FTL metadata and transfers a write lock release signal to the plurality of hosts. The first and second hosts 110a and 110b may determine whether the version values of the FTL metadata stored in the first and second memories 116a and 116b coincide with the version value of the FTL metadata stored in the memory 156 and synchronize the FTL metadata, in response to the write lock release signal.

Figure 8:
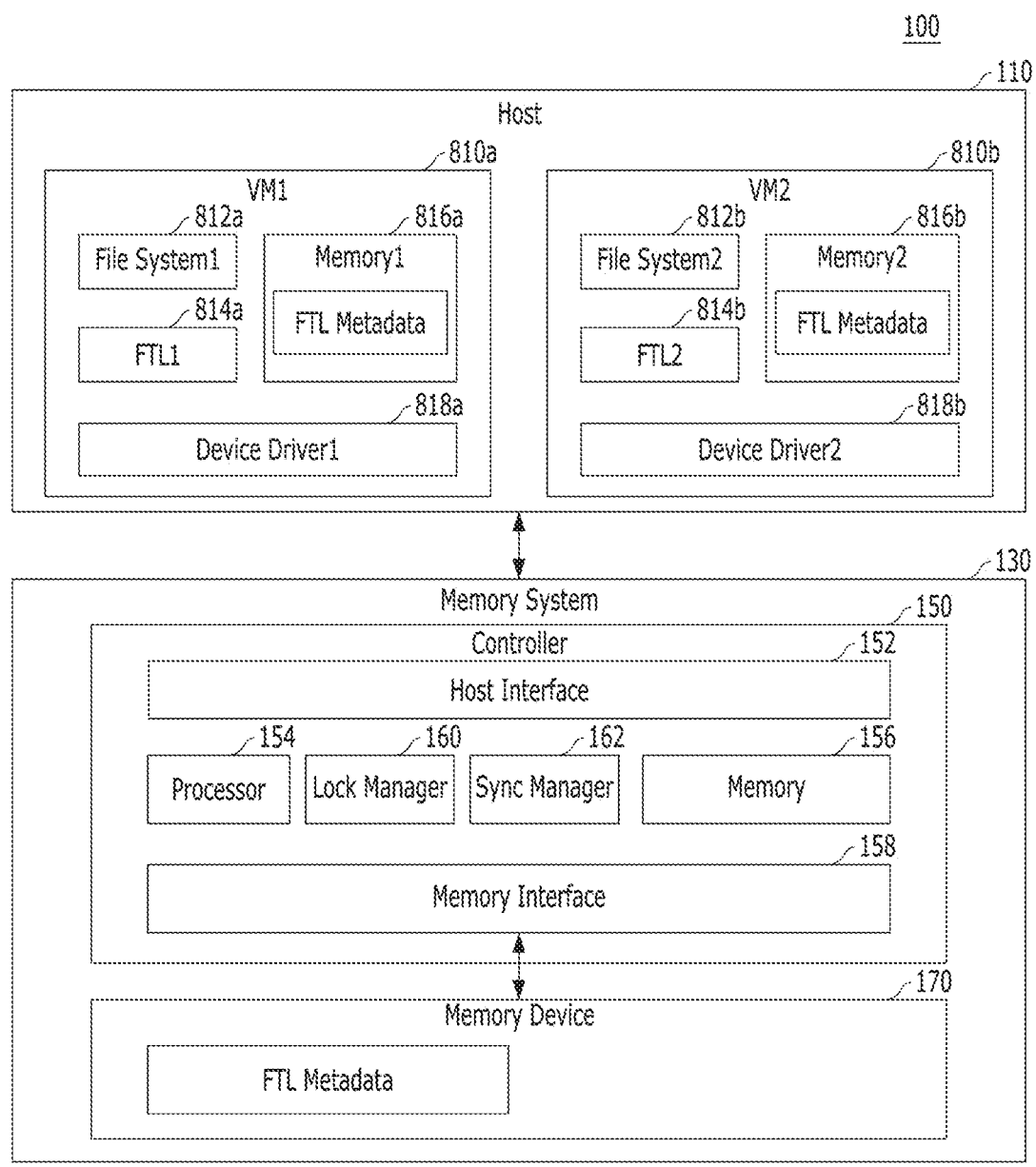
FIG. 8 schematically illustrates an example of a computing environment 100 in which an open-channel memory system that supports single root I/O virtualization (SR-IOV) communicates with a host.

FIG. 8 schematically illustrates an example of the computing environment 100 in which an open-channel memory system that supports single root I/O virtualization (SR-IOV) communicates with a host.

In an implementation, the memory system 130 may be an open-channel memory system to support SR-IOV.

The memory system 130 may include the controller 150 and the memory device 170. The controller 150 may include the host interface 152, the processor 154, the memory 156, the memory interface 158, the lock manager 160 and the sync manager 162.

One or more hosts 110 may communicate with and use the memory system 130. The host 110 may use a plurality of virtual machines. Since the memory system 130 supports the SR-IOV, the plurality of virtual machines within the host 110 may independently transfer commands to the memory system 130 and communicate data with the memory system 130, even if the host 110 communicates through a single physical port.

Since the memory system 130 is an open-channel memory system, the plurality of virtual machines may independently perform the FTL operation to access the memory system 130 using a physical address. In some implementations, each of the plurality of virtual machines may use its own file systems, FTLs and device drivers.

In some implementations, the host 110 may operate a first virtual machine 810a and a second virtual machine 810b. The first and second virtual machines 810a and 810b may be loaded to the memory (not illustrated) of the host 110 and a processor (not illustrated) within the host 110.

The first virtual machine 810a may perform operations associated with a first file system 812a, a first FTL 814a and a first device driver 818a, and the second virtual machine 810b may perform the operations associated with a second file system 812b, a second FTL 814b and a second device driver 818b.

The first and second virtual machines 810a and 810b may perform the operations provided by the first and second FTLs 814a and 814b to directly translate logical addresses of the file systems into the physical addresses, respectively, thereby accessing the memory system 130. The memory (not illustrated) within the host 110 may store operation data of the first and second FTLs 814a and 814b. For convenience of description, FIG. 8 illustrates that a first memory 816a stores the FTL metadata of the first FTL 814a, and a second memory 816b stores the FTL metadata of the second FTL 814b. In other implementations, the first and second memories 816a and 816b may be the same memory device.

Since the plurality of virtual machines independently write data to the memory system 130 and update the internal FTL metadata, the virtual machines may cause an error when the internal FTL metadata of the respective virtual machines are not synchronized with each other. For example, the virtual machines may cause errors by reading unintended data from wrong address or by performing a write operation on a memory region in which data is already written.

In an embodiment, when receiving a write lock request of the first virtual machine 810a between the plurality of virtual machines, the memory system 130 may set a write lock based on the lock status of the memory device 170, receive a write command, write data and updated FTL metadata from the first virtual machine 810a, and perform a write operation.

When the write operation is completed, the memory system 130 may release the write lock, and synchronize the FTL metadata of the plurality of virtual machines and the memory system 130. In this way, the memory system 130 may prevent the virtual machines from reading unintended data from wrong address or performing a write operation on a memory region in which data is already written. Thus, the reliability of the computing environment 100 can be improved.

Figure 9:
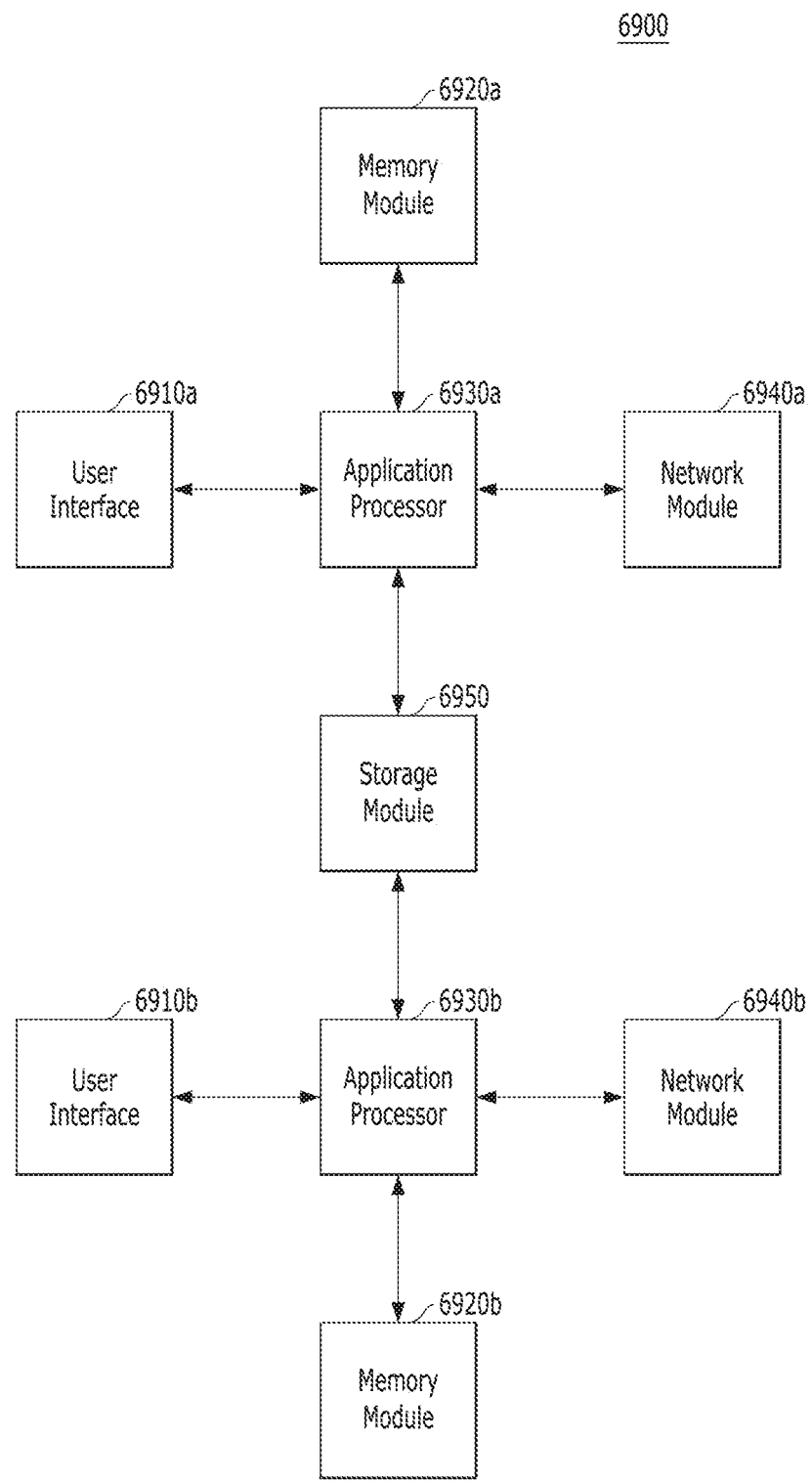
FIG. 9 schematically illustrates a user system implemented based on some embodiments of the disclosed technology.

FIG. 9 schematically illustrates a user system implemented based on some embodiments of the disclosed technology.

Referring to FIG. 9, the user system 6900 may include user interfaces 6910a and 6910b, memory modules 6920a and 6920b, application processors 6930a and 6930b, network modules 6940a and 6940b, and a storage module 6950.

The storage module 6950 may store data, for example, data received from the application processors 6930a and 6930b, and then may transmit the stored data to the application processors 6930a and 6930b. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900.

The storage module 6950 may correspond to the memory system 130 described with reference to FIGS. 1 to 8. The storage module 6950 implemented based on some embodiments may set a write lock based on whether a lock is set in the storage module 6950, when receiving a first write lock request from the application processor 6930a, perform a write operation using a write command, write data and updated FTL metadata which are received from the application processor 6930a in the write lock status, release the write lock when the write operation is completed, and control synchronization of the internal FTL metadata of the plurality of application processors 6930a and 6930b and the storage module 6950.

The plurality of application processors 6930a and 6930b may correspond to the first and second hosts 110a and 110b described with reference to FIGS. 1 to 8. More specifically, the application processors 6930a and 6930b may execute instructions associated with components included in the user system 6900, for example, an operating system (OS), and include controllers, interfaces and a graphic engine which control the components included in the user system 6900. The application processors 6930a and 6930b may be provided as System-on-Chip (SoC).

The memory modules 6920a and 6920b may be used as a main memory, work memory, buffer memory or cache memory of the user system 6900. The memory modules 6920a and 6920b may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDRAM, LPDDR2 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930a and the memory module 6920a, and the application processor 6930b and the memory module 6920b may be packaged and mounted, based on Package on Package (PoP).

The network modules 6940a and 6940b may communicate with external devices. For example, the network modules 6940a and 6940b may support wired or wireless communications. Examples of wireless communication schemes include code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system, the host system, and the computing environment based on the embodiments of disclosed technology can be applied to wired/wireless electronic devices. The network module 6940a may be included in the application processor 6930a, and the network module 6940b may be included in the application processor 6930b.

The user interface 6910a may include interfaces for communicating data and/or commands between the application processor 6930a and an external device. The user interface 6910b may include interfaces for communicating data and/or commands between the application processor 6930b and an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

In some embodiments of the disclosed technology, a memory system may include a plurality of storage areas, each accessible by a plurality of hosts, a memory to store executable instructions for adapting a file system to constraints imposed by the one or more storage areas, and a processor in communication with the memory to read the executable instructions from the memory to receive a request for an operation from one of the hosts to access at least one of the plurality of storage areas, set, upon a determination that there is no current lock on the at least one storage area to be accessed, a lock for the at least one storage area to be accessed, update file system metadata to match file system metadata used by the one of the hosts accessing the at least one storage area, and update a version value of the file system metadata associated with the at least one storage area.

The executable instructions further include instructions that cause the processor to provide a queue for another one of the hosts to request for an operation to the at least one storage area being accessed by the one of the hosts. The executable instructions further include instructions that cause the processor to provide a queue for another one of the hosts to send, upon completion of the operation by the one of the hosts, a lock release signal to the another one of the hosts.

The executable instructions further include instructions that cause the processor to provide a queue for another one of the hosts to notify the updated file system metadata and the updated version value to the another one of the hosts that requests for an operation to the at least one storage area being accessed by the one of the hosts. The executable instructions further include instructions that cause the processor to provide a queue for another one of the hosts to send, upon receipt of the request for the operation from one of the hosts, a current version value of the file system metadata.

The lock includes at least one of a write lock or a read lock to indicate the at least one storage area is subject to a write operation or a read operation, respectively. Here, the file system metadata includes metadata used by a flash translation layer (FTL). The file system metadata includes an address mapping table to store a mapping between physical addresses and logical addresses associated with the requested operation. The file system metadata further includes block status information to indicate whether the at least one storage area is available for a write operation. The file system metadata used by the one of the hosts accessing the at least one storage area includes an address mapping table used in performing the requested operation.

In some embodiments of the disclosed technology, a memory system may include a plurality of storage areas, each accessible by a plurality of hosts, a memory to store executable instructions for adapting a file system to constraints imposed by the one or more storage areas, and a processor in communication with the memory to read the executable instructions from the memory to receive, from one of the hosts, a request for accessing at least one of the plurality of storage areas, the request including a lock request for the at least one of the plurality of storage areas, determine whether there is a conflict between the lock request and another lock that is currently set by another one of the hosts, and set, upon a determination that there is no conflict, a lock for the at least one storage area.

Here, determining whether there is the conflict includes determining whether both the lock request by the one of the hosts and the other lock currently set by another one of the hosts are for write operations for the at least one of the plurality of storage areas. In this case, the executable instructions further include instructions that cause the processor to provide, upon determination that both the lock request by the one of the hosts and the other lock currently set by another one of the hosts are for write operations, a queue for the requested write operation by the one of the hosts to prevent the one of the hosts from accessing the at least one storage area. The executable instructions further include instructions that cause the processor to update, upon completion of an operation associated with the other lock set by the other of the hosts, file system metadata to match file system metadata used by the other of the hosts, and update a version value of the file system metadata associated with the other lock set by the other of the hosts.

The executable instructions further include instructions that cause the processor to notify the updated file system metadata and the updated version value to another one of the hosts that requests for an operation to the at least one storage area being accessed by the one of the hosts. The executable instructions further include instructions that cause the processor to send, upon completion of an operation associated with the other lock set by the other of the hosts, a lock release signal to the one of the hosts.

Furthermore, determining whether there is the conflict includes determining whether both the lock request by the one of the hosts and the other lock currently set by another one of the hosts are for read operations for the at least one of the plurality of storage areas. In this case, the executable instructions further include instructions that cause the processor to provide the one of the hosts an access to the at least one storage area.

The file system metadata includes metadata used by a flash translation layer (FTL). The file system metadata includes an address mapping table to store a mapping between physical addresses and logical addresses associated with the requested operation.

In the embodiments of the disclosed technology, it is possible to provide a computing environment capable of supporting synchronization of FTL metadata included in a plurality of hosts in communication with a memory system.

Although various embodiments have been described for illustrative purposes, it will be apparent to those skilled in the art that various changes and modifications may be made without departing from the spirit and scope of the invention as defined in the following claims.

What is claimed is:
1. A memory system, comprising:
a plurality of storage areas, each accessible by a plurality of hosts each including a flash translation layer (FTL);
a memory to store executable instructions for adapting a file system to constraints imposed by the plurality of storage areas; and
a processor in communication with the memory, wherein the executable instructions upon execution by the processor cause the processor to:
receive a request for an operation from one of the hosts to access at least one of the plurality of storage areas;
set, upon a determination that there is no current lock on the at least one storage area to be accessed, a lock for the at least one storage area to be accessed;
update file system metadata to match file system used by the one of the hosts accessing the at least one storage area, wherein the file system metadata includes FTL metadata used by the FTL; and
update a version value of the file system metadata associated with the at least one storage area,
wherein when receiving a read lock request for a read request from one or more hosts among the plurality of hosts, the processor allows only a read request to be received from the one or more hosts, and
wherein when receiving a write lock request, the processor receives a write request that includes a write command, write data and updated FTL metadata.

2. The system of claim 1, wherein the executable instructions further include instructions that upon execution by the processor cause the processor to:

provide a queue for another one of the hosts to request for an operation to the at least one storage area being accessed by the one of the hosts.

3. The system of claim 2, wherein the executable instructions further include instructions that upon execution by the processor cause the processor to:

send, upon completion of the operation by the one of the hosts, a lock release signal to the another one of the hosts.

4. The system of claim 1, wherein the executable instructions further include instructions that upon execution by the processor cause the processor to:

notify the updated file system metadata and the updated version value to another one of the hosts that requests for an operation to the at least one storage area being accessed by the one of the hosts.

5. The system of claim 1, wherein the executable instructions further include instructions that upon execution by the processor cause the processor to:

send, upon receipt of the request for the operation from one of the hosts, a current version value of the file system metadata.

6. The system of claim 1, wherein the lock includes at least one of a write lock or a read lock to indicate the at least one storage area is subject to a write operation or a read operation, respectively.

7. The system of claim 1, wherein the file system metadata includes an address mapping table to store a mapping between physical addresses and logical addresses associated with the requested operation.

8. The system of claim 7, wherein the file system metadata further includes block status information to indicate whether the at least one storage area is available for a write operation.

9. The system of claim 1, wherein the file system metadata used by the one of the hosts accessing the at least one storage area includes an address mapping table used in performing the requested operation.

10. A memory system which is coupled to a plurality of hosts each including a flash translation layer (FTL), the memory system comprising:

a processor configured for allowing only a write request to be received from any one of the plurality of hosts, when a write lock for a write request from the any one host is set; and a storage area controlled by the processor, and configured for performing a write operation according to the write request from the any one host, wherein the processor is configured for:

setting a write lock depending on whether a lock is set in the storage area, when a write lock request is received from the any one host;

releasing the write lock when the write operation is completed; and controlling synchronization of FTL metadata of the FTLs of the other hosts excluding the any one host, according to whether the write operation is successfully performed, wherein when receiving a read lock request for a read request from one or more hosts among the plurality of hosts, the processor allows only a read request to be received from the one or more hosts, and wherein when receiving the write lock request, the controller receives a write command, write data and updated FTL metadata updated by the host, which are included in the write request.

11. The memory system of claim 10, wherein the processor sets the write lock in a write region corresponding to the write lock request in the storage area, when a write lock or read lock of another host which is not the any one host among the plurality of hosts is not set in the corresponding write region.

12. The memory system of claim 11, wherein the processor queues the write lock request or transfers a fail signal of the write lock request to the any one host, when a write lock or read lock of the other host is set in the corresponding write region.

13. The memory system of claim 10, wherein the processor sets a read lock depending on whether a lock is set in the storage area, when the read lock request is received, and releases the read lock when a read operation corresponding to the read request is completed by the storage area.

14. The memory system of claim 13, wherein the processor sets the read lock in a read region corresponding to the read lock request in the storage area, when a write lock of another host which is not the any one host among the plurality of hosts is not set in the corresponding read region.

15. The memory system of claim 10, wherein the processor reflects the updated FTL metadata into the memory system depending on whether the write operation is successfully performed, and controls synchronization of the FTL metadata of the other hosts by transferring the updated FTL metadata to the other hosts.

16. The memory system of claim 10, wherein the processor transfers the write lock release signal to the other hosts depending on whether the write operation is completed.

17. The memory system of claim 10, wherein the processor allows only a write request to be received from the any one host, and then receives a write command, write data and updated FTL metadata updated by the host, which are included in the write request, from the any one host.

* * * * *